US009571525B2

(12) United States Patent
Nishizawa et al.

(10) Patent No.: US 9,571,525 B2
(45) Date of Patent: Feb. 14, 2017

(54) POLICY MANAGEMENT SYSTEM, ID PROVIDER SYSTEM, AND POLICY EVALUATION DEVICE

(71) Applicants: Kabushiki Kaisha Toshiba, Minato-ku (JP); Toshiba Solutions Corporation, Kawasaki-shi (JP)

(72) Inventors: Minoru Nishizawa, Fuchu (JP); Junichi Yamamoto, Fuchu (JP); Kouji Gouda, Fuchu (JP); Yasuomi Une, Kawasaki (JP); Masaya Hirabara, Fuchu (JP); Yuichiro Esaki, Fuchu (JP); Masataka Yamada, Fuchu (JP)

(73) Assignees: KABUSHIKI KAISHA TOSHIBA, Minato-ku (JP); TOSHIBA SOLUTIONS CORPORATION, Kawasaki-shi (JP)

( * ) Notice: Subject to any disclaimer, the term of this patent is extended or adjusted under 35 U.S.C. 154(b) by 0 days.

(21) Appl. No.: 14/670,036

(22) Filed: Mar. 26, 2015

(65) Prior Publication Data
US 2015/0200971 A1 Jul. 16, 2015

Related U.S. Application Data

(63) Continuation of application No. PCT/JP2012/074689, filed on Sep. 26, 2012.

(51) Int. Cl.
*H04L 9/00* (2006.01)
*H04L 29/06* (2006.01)
*G06F 21/60* (2013.01)

(52) U.S. Cl.
CPC .......... *H04L 63/20* (2013.01); *G06F 21/604* (2013.01); *H04L 63/0807* (2013.01); *H04L 63/0815* (2013.01)

(58) Field of Classification Search
CPC .................................................. H04L 63/108
See application file for complete search history.

(56) References Cited

U.S. PATENT DOCUMENTS 7,395,333 B1* 7/2008 Saulpaugh .......... H04L 63/0807
709/203
7,606,801 B2 10/2009 Faitelson et al.
(Continued)

FOREIGN PATENT DOCUMENTS

CN  1956385 A  5/2007
JP  2009-129289 A  6/2009
(Continued)

OTHER PUBLICATIONS

International Search Report issued on Nov. 6, 2012 for PCT/JP2012/074689 filed on Sep. 26, 2012 with English Translation.
(Continued)

*Primary Examiner* — Josnel Jeudy
(74) *Attorney, Agent, or Firm* — Oblon, McClelland, Maier & Neustadt, L.L.P.

(57) ABSTRACT

According to one embodiment, a policy management system includes a user terminal, an ID provider system which manages an identity of a user, and a service provider system which provides service data. The ID provider system stores a pair of an old policy and a new policy with respect to each service provider ID. The ID provider system stores information with respect to each service provider ID, the difference-adaptive definition information defining a first condition which is referred to when a date of transmission of an access request message is within a transition period from the old policy to new policy, and a second condition which is referred to when the date of transmission of the access request message is out of the transition period.

3 Claims, 8 Drawing Sheets

(56) References Cited

U.S. PATENT DOCUMENTS

| | | |
|---|---|---|
| 2003/0115484 A1 | 6/2003 | Moriconi et al. |
| 2007/0094199 A1 | 4/2007 | Deshpande et al. |
| 2007/0143829 A1 | 6/2007 | Hinton et al. |
| 2013/0247142 A1 | 9/2013 | Nishizawa et al. |

FOREIGN PATENT DOCUMENTS

| | | |
|---|---|---|
| JP | 2010-152463 A | 7/2010 |
| JP | 4892093 B1 | 12/2011 |
| JP | 2012-103846 A | 5/2012 |
| WO | WO 2012/063783 A1 | 5/2012 |

OTHER PUBLICATIONS

International Written Opinion mailed on Nov. 6, 2012 for PCT/JP2012/074689 filed on Sep. 26, 2012.
Singaporean Search Report and Written Opinion issued Sep. 17, 2015 in Patent Application No. 11201502282Q.
Office Action issued Oct. 17, 2016, in Chinese Patent Application No. 201280076072.3 (with English language translation).

\* cited by examiner

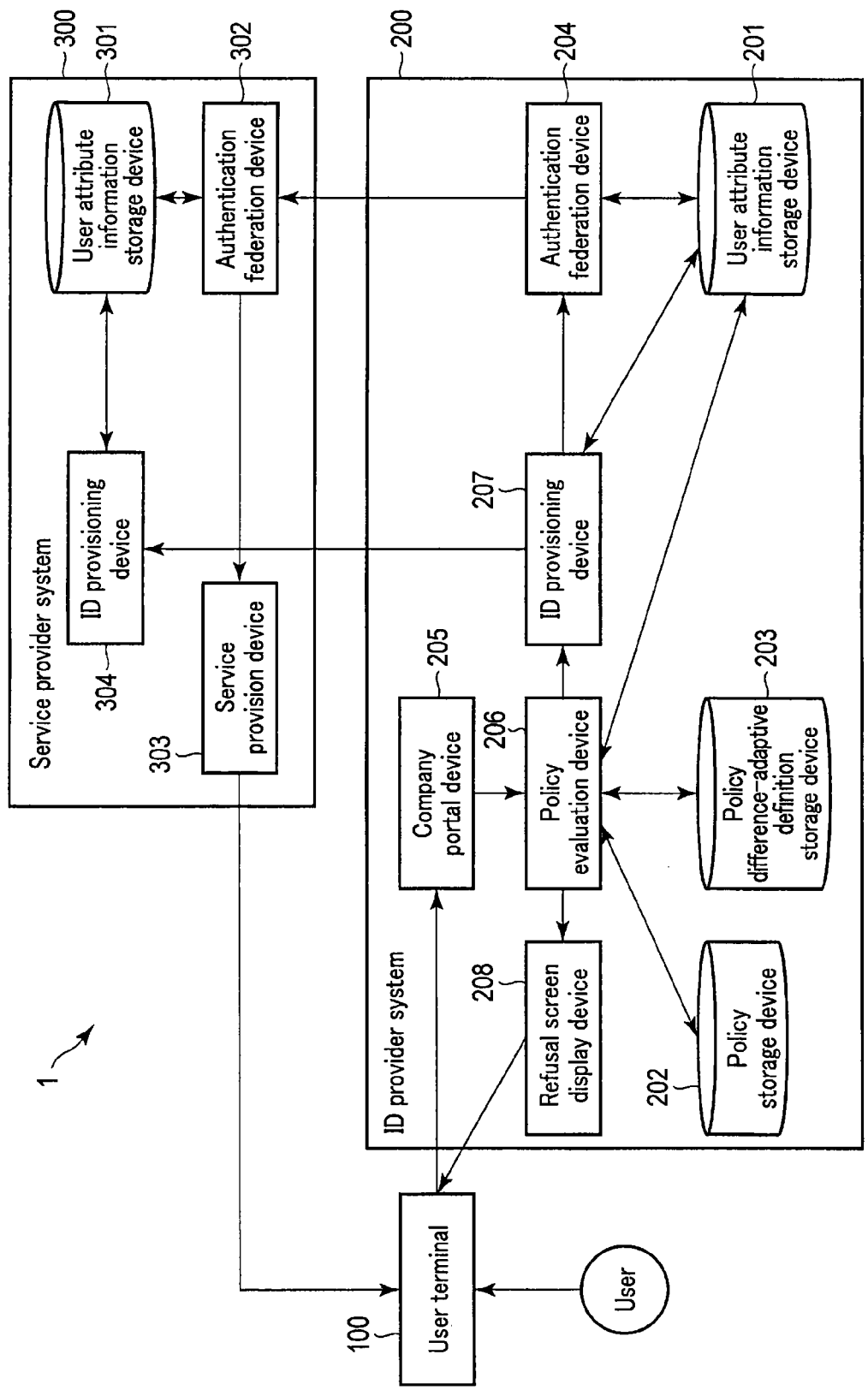
F I G. 1

Service provider ID: service provider system 300
■ Valid period
2011/4/1~2011/9/30
■ Transition period
Not designated
■ Determination condition
○ Determination ID = OLD-PERMIT-1
If the following conditions are satisfied, use is permitted, and a designated duty is executed
1. Belonging to X department
2. Official post is chief or above
3. Number of user IDs is upper limit or less
4. User ID of service provider system is not registered
⇒ Duty: execution of user ID registration ○ Determination ID = OLD-PERMIT-2
If the following conditions are satisfied, use is permitted, and a designated duty is executed
1. Belonging to X department
2. Official post is chief or above
3. User ID of service provider system has already been registered
⇒ Duty: execution of authentication federation request ○ Determination ID = OLD-DENY-3
If the following conditions are satisfied, use is refused, and a designated duty is executed
1. Determination ID = OLD-PERMIT-1 is not established
2. Determination ID = OLD-PERMIT-2 is not established
⇒ Duty: execution of refusal screen display 202a

F I G. 2

Service provider ID: service provider system 300
■Valid period
2011/10/1~2012/3/31
■Transition period
2011/10/1~2011/10/30
■Determination condition
○Determination ID = NEW-PERMIT-1
If the following conditions are satisfied, use is permitted, and a designated duty is executed
1. Belonging to Y department
2. Official post is chief or above
3. Number of user IDs is upper limit or less
⇒ Duty: execution of user ID registration
      However, if there is an absent user, this user is deleted, and user ID is assigned to new user ○Determination ID = NEW-PERMIT-2
If the following conditions are satisfied, use is permitted, and a designated duty is executed
1. Belonging to Y department
2. Official post is chief or above
3. User ID of service provider system has already been registered
⇒ Duty: execution of authentication federation request ○Determination ID = NEW-DENY-3
If the following conditions are satisfied, use is refused, and a designated duty is executed
1. Determination ID = NEW-PERMIT-1 is not established
2. Determination ID = NEW-PERMIT-2 is not established
⇒ Duty: execution of refusal screen display

FIG. 3

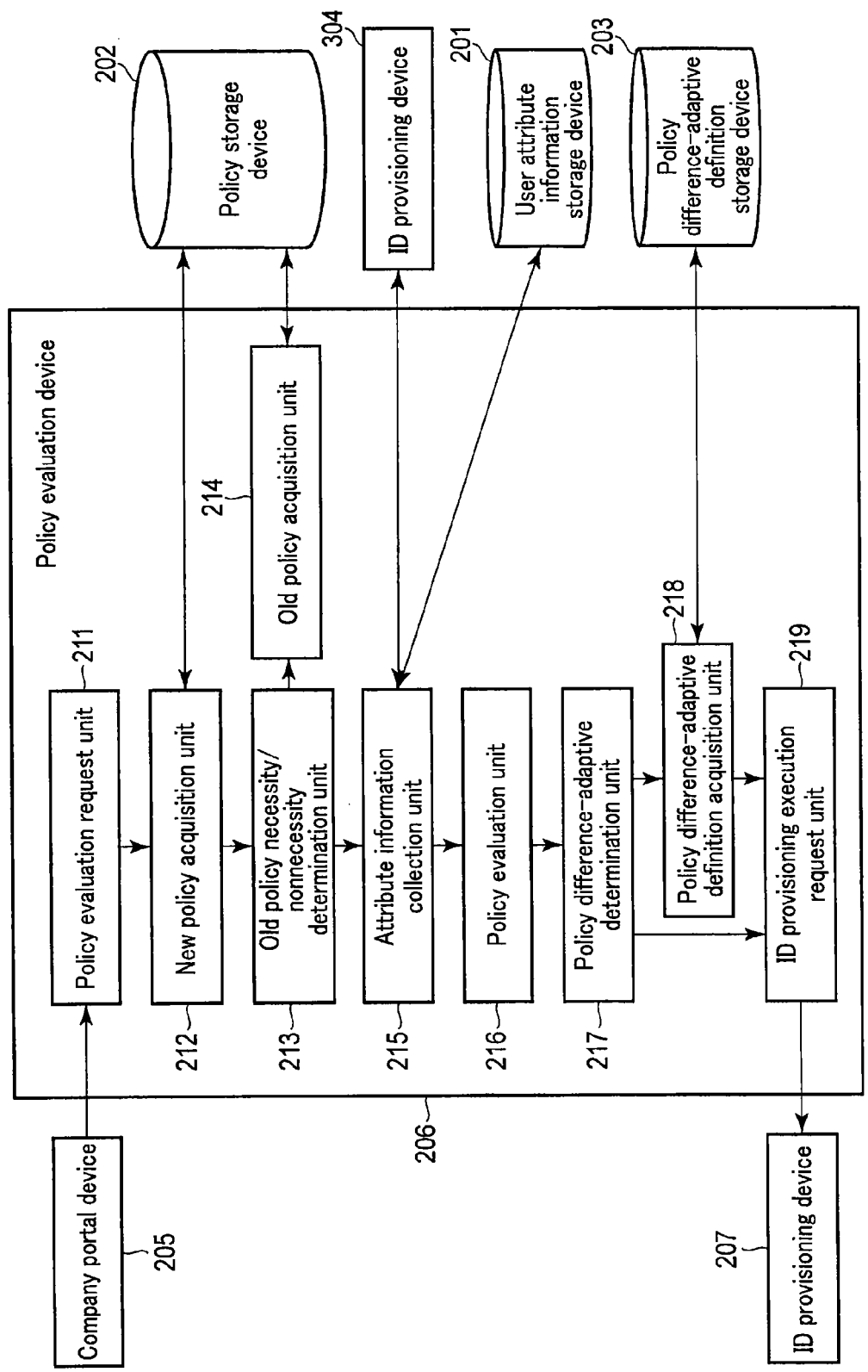
F I G. 5

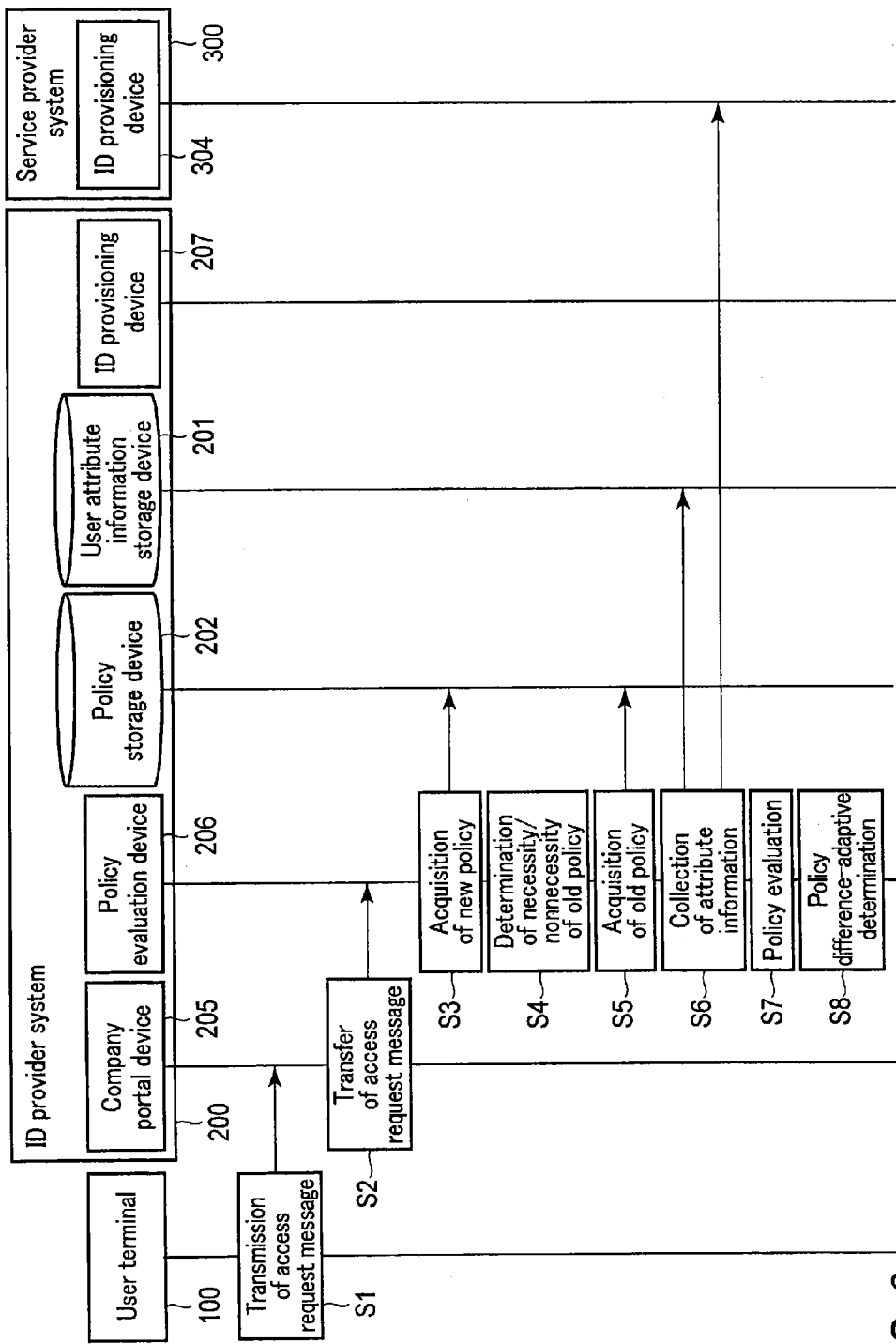
F I G. 6

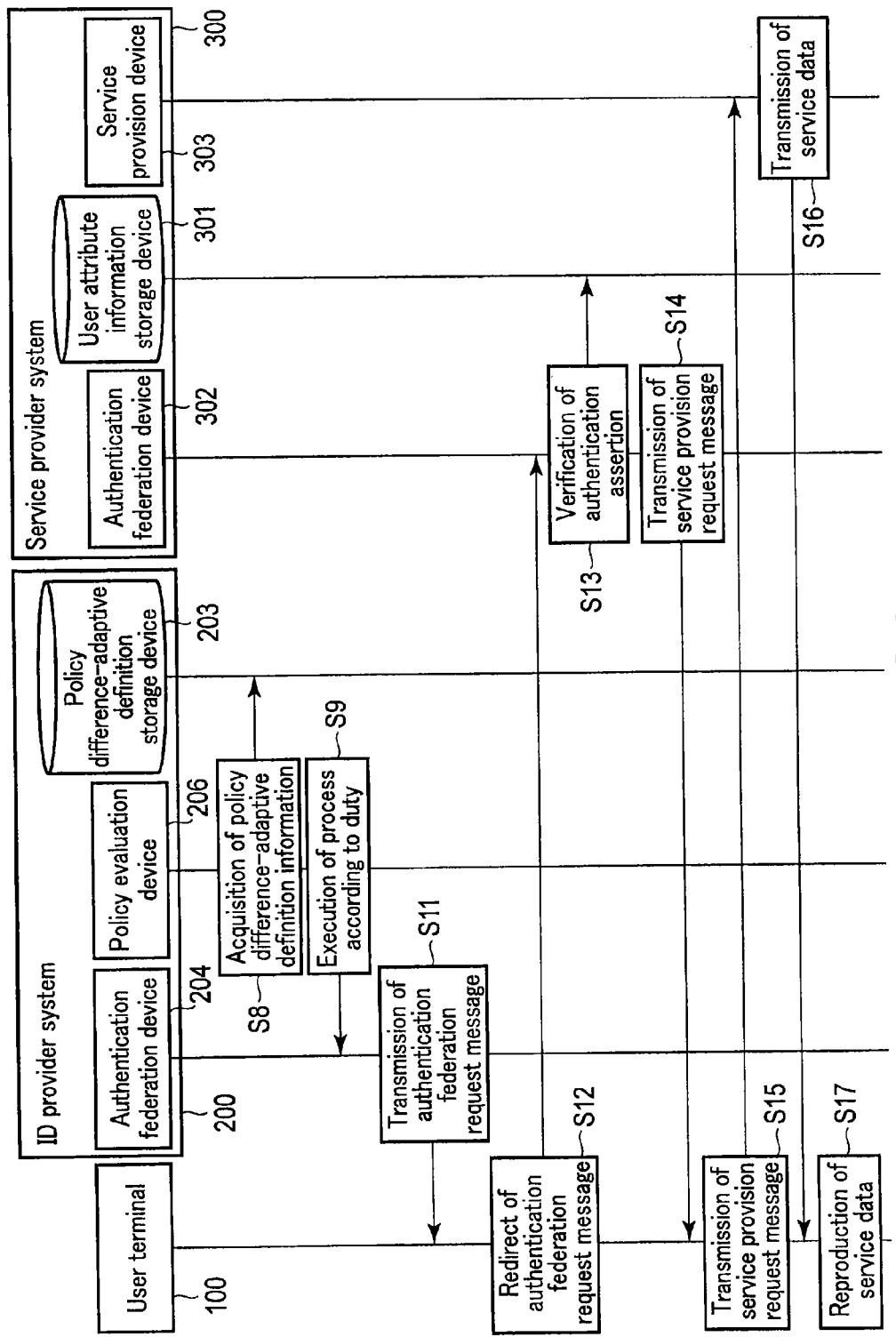
F I G. 7

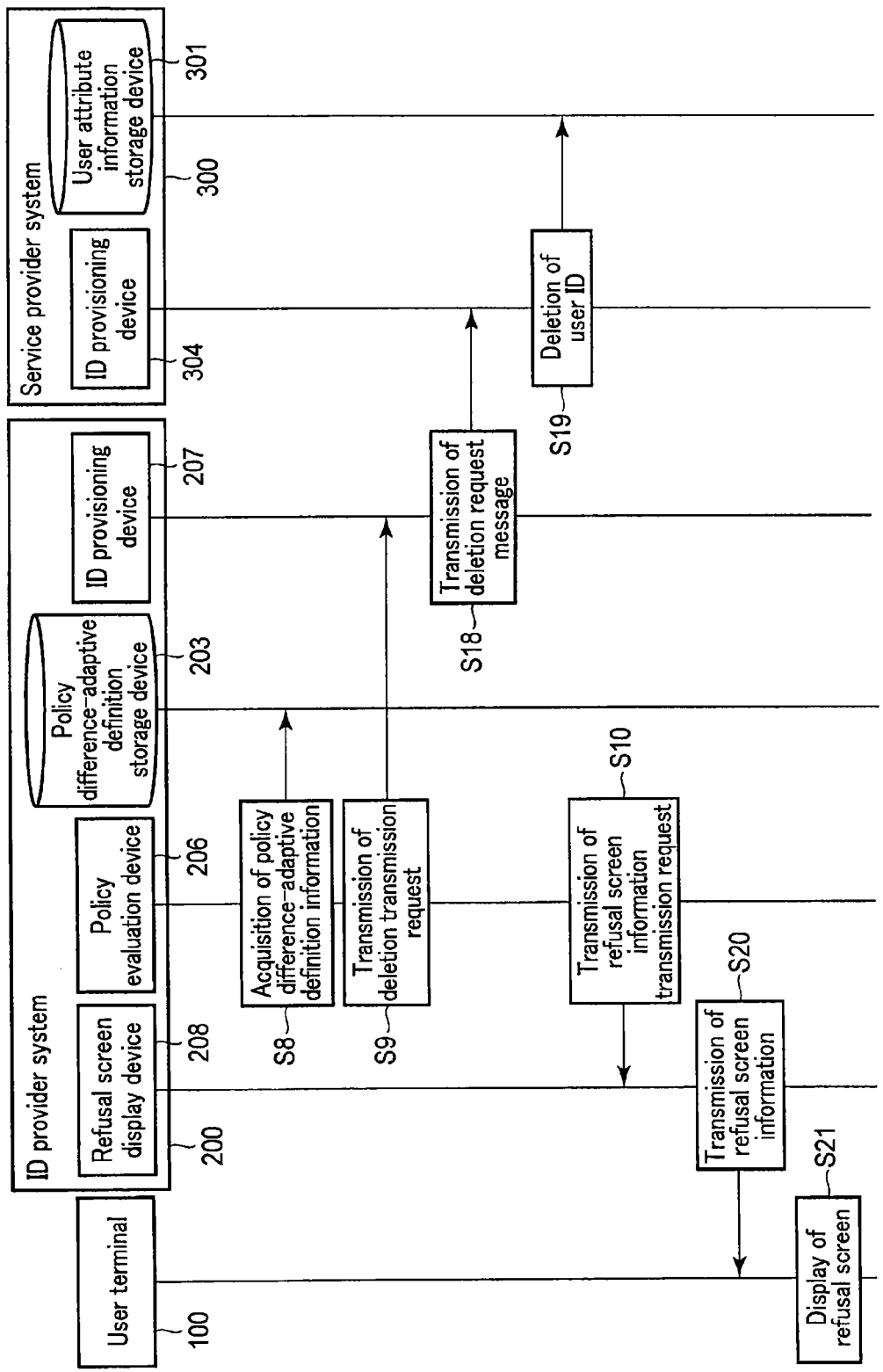
F I G. 8

POLICY MANAGEMENT SYSTEM, ID PROVIDER SYSTEM, AND POLICY EVALUATION DEVICE

CROSS REFERENCE TO RELATED APPLICATIONS

This application is a Continuation Application of PCT Application No. PCT/JP2012/074689, filed Sep. 26, 2012, the entire contents of which are incorporated herein by reference.

FIELD

Embodiments described herein relate generally to a policy management system, an ID provider system, and a policy evaluation device.

BACKGROUND

With the background of the situation in which the degree of dependency on online services of the society, economy and living increases, there has been an increasing importance of identity management which manages information relating to individuals and organizations. The identity management is a technique for promoting the security and convenience of the information relating to individuals and organizations in various services and systems, and managing the whole of the life cycle of an identity from registration to a change and deletion.

Here, the identity, in this context, refers to the whole of information which specifies an individual, a group, and an organization/company in a certain situation, and includes an identifier, credentials and attributes. The identifier is information for discriminating the identity, and corresponds to, for instance, an account or an employee number. The credentials are information for indicating the validity of some information content, and are, for instance, a password. The attributes are information which characterizes the identity, and refer to, for instance, a name, an address, and date of birth.

As a typical example of the technique utilizing such identity management, there is known Single Sign-On (hereinafter abbreviated as SSO). The SSO is a technique which enables use of a plurality of applications and services by a single authentication procedure. In many cases, the SSO integrates authentications which are provided in a plurality of applications in a single domain such as an intranet of one company. In this case, the SSO is generally realized by a method in which an authentication result is included in an HTTP Cookie and the authentication result is shared between the applications. In addition, such SSO methods have been individually manufactured as access management products by SI (System Integration) vendors or middleware vendors.

In recent years, there has been a demand for an SSO among different domains (hereinafter also referred to as cross-domains) across a single domain. A reason for this is outsourcing due to an acceleration of the consolidation and merger of companies, overseas expansion, and SaaS (Software as a Service) or the like in emerging cloud computing. For example, one of the merits of the SaaS or the like is quick use when needed.

However, when cross-domain SSO is realized, sharing of an authentication result is very time-consuming. There are two main causes. The first cause is that, since the use of HTTP Cookie is limited to a single domain, an authentication result cannot be shared between domains by using the HTTP Cookie. The second cause is that, since SSO methods of access management products, which are adopted for respective domains, are different among vendors, simple introduction is not possible and additional measures need to be prepared.

In order to resolve such causes, there has been an increasing demand for standardization of the SSO. One of typical standardization techniques, which meet such a demand, is SAML (Security Assertion Markup Language) which was formulated by a nonprofit organization, OASIS (Organization for the Advancement of Structured Information Standards).

The SAML is specifications in which the expression form of information relating to authentication, approval and attributes, and transmission/reception procedures are defined, and the SAML is systematically stipulated so as to realize various implementation modes in accordance with purposes. Subjects comprise three parties, i.e. an identity provider (hereinafter, abbreviated as IdP, and referred to as "ID provider"), a service provider (hereinafter, abbreviated as SP, and referred to as "service provider"), and a user. The SSO is realized by the service provider trusting an authentication result which is issued by the ID provider.

When the SSO based on SAML is started, the following two points, in general, need to be prepared in advance. The first point is that the relationship of trust should be established in advance by information exchange and consensus building in business and technical aspects between the service provider and ID provider. The second point is that one user should have individual accounts for respective service providers and should federate these individual SP accounts and the account of the ID provider in advance. The SSO cannot be started unless in a state in which advance preparations, such as the establishment of the relationship of trust and the advance account federation, have been completed.

After these advance preparations, the SSO is realized by the following procedures (1) to (6). Here, the procedures of the SSO through a Web browser are described.

(1) A user requests service provision from a service provider.

(2) Since the service provider has not yet authenticated the user, the service provider sends an authentication request to the ID provider via a user-side Web browser.

(3) The ID provider authenticates the user by some means, and creates an authentication assertion. Incidentally, the SAML does not stipulate the means for authentication, but stipulates a scheme for informing the service provider of an authentication assertion. The authentication assertion includes information, such as the kind of authentication means and the manner in which the credentials were created, in order for the service provider to determine whether the authentication result is trustworthy or not.

(4) The ID provider returns an authentication result including the created authentication assertion to the service provider via the user-side Web browser.

(5) The service provider determines permission/non-permission of service provision, based on the authentication result of the ID provider.

(6) The user receives service provision from the service provider.

In this manner, in the SSO that is based on SAML, a plurality of services are made usable by the user simply executing a one-time authentication procedure for the ID provider, without executing a further authentication procedure. At present, in order to secure interoperability of cross-domains, the middle vendor, which implemented the individual SSO system, sells access management products in which an SAML ID provider/service provider function is implemented, or introduces a commercial Web service in which an SAML service provider function is implemented.

In the meantime, in the SSO based on SAML, as described above, the advance account federation and registration are necessary. In usual cases, when a company uses a service which is provided by a service provider, an IS (Information System) department performs account registration and federation for the service provider.

The IS department collectively performs a large volume of advance processes corresponding to many users belonging to the company, or conducts, after a procedure through a serial approval flow at an arbitrary timing given by a user, the account registration and federation for this user.

Here, in the former case of executing the advance process, since there is no need to execute account registration and federation in the process of the SSO, there is no relation to the above-described data processing system.

On the other hand, in the latter case of the procedure through the approval flow, a great deal of time and labor is needed since the procedure is conducted through not only the user but also many people, such as superiors in layers of the organizational hierarchy to which the user belongs, and people in a procurement department and an IS department. Furthermore, since the IS department does not collectively perform the advance processes, manual operations occur, which are burdensome and are low in efficiency and convenience. For example, it is not possible to utilize the merit of quick use in SaaS, etc.

Accordingly, in the system which executes account registration and federation in the process of the SSO, it is preferable that the system has a seamless scheme for determining permission/non-permission of service use in a non-manual manner.

Thus, there is a technique for automating a series processes from the application for use of services provided by a service provider to the SSO, by inserting, between the procedures (2) and (3) of the SSO, a process of executing account federation and registration after evaluating permission/non-permission of use of services provided by the service provider, based on a pre-defined policy relating to service use and the condition of service use.

The above-described technique has no problem in usual cases. However, according to the study by the inventor, there is room for improvement, as described below.

Usually, in a company, if a change in organization or personnel is made, the policy is updated from the standpoint of security. However, when a change in organization or personnel is made, it is necessary to conduct a handover work which follows the change in organization or personnel. If the policy is immediately updated without a manual operation, such a problem may occur that services, which are used in the handover work, cannot be utilized. Thus, in general, the update of the policy due to a change in organization or personnel is performed by a manual operation (i.e. the user performs a policy update work).

However, a manual work imposes a heavy load on the user, and there is a concern that a work error (human error) will occur.

BRIEF DESCRIPTION OF THE DRAWINGS

FIG. 1 is a schematic view illustrating a configuration example of a policy management system according to an embodiment.

FIG. 2 is a schematic view illustrating an example of an old policy which is stored in a policy storage device according to the embodiment.

FIG. 3 is a schematic view illustrating an example of a new policy which is stored in the policy storage device according to the embodiment.

FIG. 5 is a schematic view illustrating a configuration example of a policy evaluation device according to the embodiment.

FIG. 6 is a sequence chart illustrating an example of the operation of the policy management system according to the embodiment.

FIG. 7 is a sequence chart illustrating an example of the operation of the policy management system according to the embodiment.

FIG. 8 is a sequence chart illustrating an example of the operation of the policy management system according to a modification of the embodiment.

DETAILED DESCRIPTION

Figure 4:
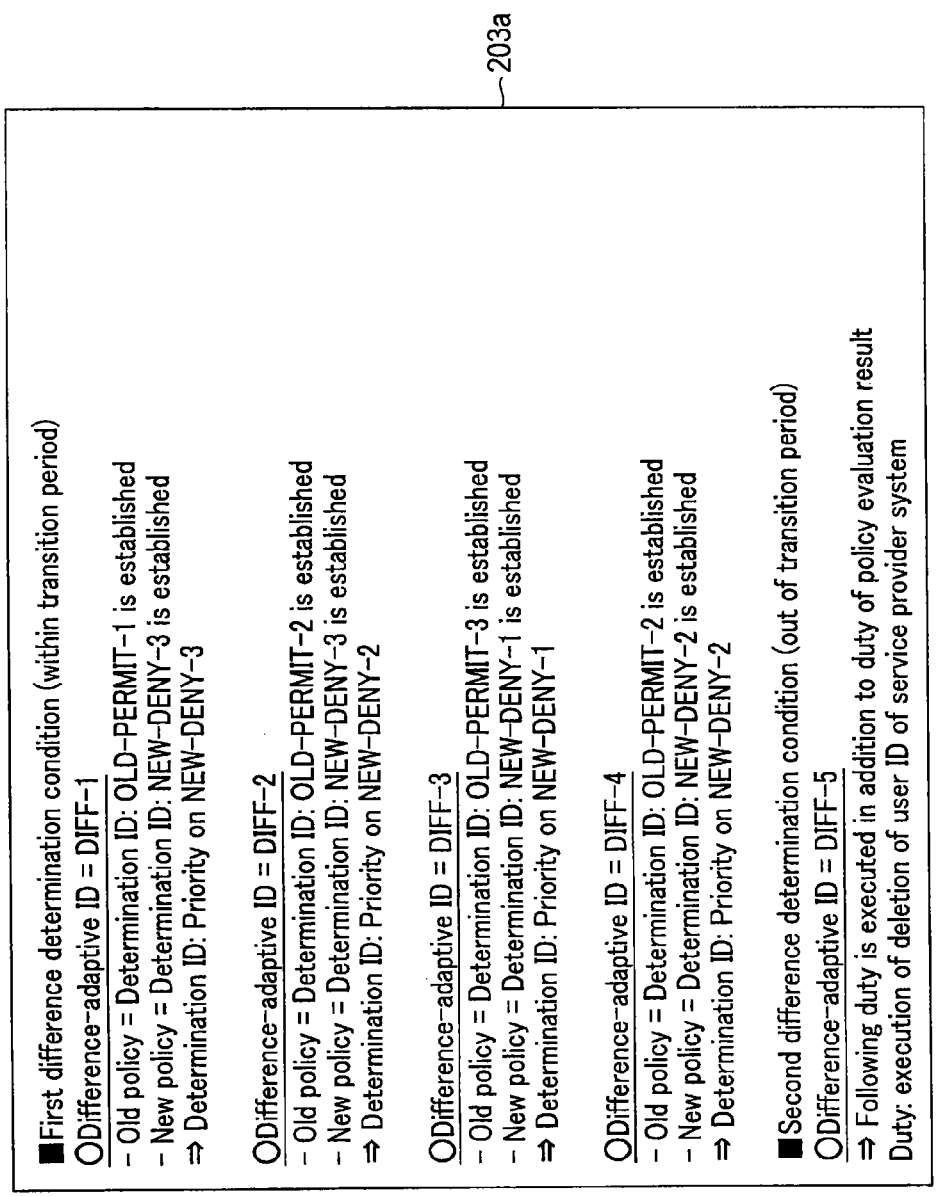
FIG. 4 is a schematic view illustrating an example of difference-adaptive definition information which is stored in a difference-adaptive definition storage device according to the embodiment.

Various embodiments will be described hereinafter with reference to the accompanying drawings.

In general, according to one embodiment, a policy management system includes a user terminal, an ID provider system configured to manage an identity of a user who operates the user terminal, and a service provider system configured to provide service data to the user terminal. The user terminal includes login execution device, first transmission device, and reproducing device.

The login execution device executes a login process with the ID provider system in accordance with an operation of the user.

The first transmission device transmits to the ID provider system an access request message including an ID provider authentication token, which is issued at a time of the login process and includes a user ID which identifies the user, and a service provider ID which identifies the service provider system.

The reproducing device receives the service data which is transmitted from the service provider system, and reproduces the received service data.

The ID provider system includes first storage device, second storage device, third storage device, first acquisition device, first determination device, second acquisition device, confirmation device, notification reception device, policy evaluation device, second determination device, third acquisition device, decision device, execution request device, second transmission device, third transmission device.

The first storage device stores user attribute information which includes at least the user ID, and in which item names and item values of attributes of the user for identifying the user are associated.

The second storage device stores a pair of an old policy and a new policy, with respect to each said service provider ID, the old policy and the new policy defining at least a determination condition for permitting transmission of the service data by the service provider system identified by the service provider ID, and a transition period indicative of a period during which a determination result by the determination condition of not only the new policy but also the old policy is referred to when the old policy is transitioned to the new policy, the determination condition including a plurality of conditions which are identified by a determination ID, and each of the plurality of conditions further including a plurality of detailed conditions and a duty.

The third storage device stores difference-adaptive definition information with respect to each said service provider ID, the difference-adaptive definition information including a first difference determination condition which is referred to when a date of transmission of the transmitted access request message is within the transition period, and a second difference determination condition which is referred to when the date of transmission of the transmitted access request message is out of the transition period, the second difference determination condition including a condition, which is identified by a difference-adaptive ID, and a duty.

The first acquisition device acquires, upon receiving the transmitted access request message, the new policy corresponding to the service provider ID in the access request message.

The first determination device determines whether the date of transmission of the access request message is included in the transition period defined in the acquired new policy.

The second acquisition device acquires the old policy corresponding to the acquired new policy, if a determination result by the first determination device indicates that the date of transmission is included.

The confirmation device acquires the user attribute information stored in the first storage device, based on the user ID included in the ID provider authentication token in the access request message, and confirms whether the user ID is stored in the service provider system identified by the service provider ID in the access request message.

The notification reception device receives a notification which is transmitted from the service provider system and corresponds to the confirmation device, the notification indicating that the user ID is stored or that the user ID is not stored.

The policy evaluation device evaluates the acquired new policy, or the acquired new policy and old policy, based on the acquired user attribute information.

The second determination device determines whether there is a need to acquire the difference-adaptive definition information, based on an evaluation result by the policy evaluation device and the notification received by the notification reception device.

The third acquisition device acquires the difference-adaptive definition information, if a determination result by the second determination device indicates that there is the need to acquire the difference-adaptive definition information.

The decision device decides on the determination ID that is applied, based on at least the evaluation result (and also by referring to the difference-adaptive definition information when the difference-adaptive definition information was acquired by the third acquisition device).

The execution request device requests execution of the duty in the condition identified by the determination ID that was decided on (and also requesting execution of the duty in the second difference determination condition when the second difference determination condition defined in the difference-adaptive definition information was referred to by the decision device).

The second transmission device transmits, in accordance with a request from the execution request device, an authentication federation message including at least the user ID, which is included in the ID provider authentication token in the access request message, to the service provider system identified by the service provider ID in the access request message.

The third transmission device transmits to the user terminal, in accordance with a request from the execution request device, refusal screen information which effects display to indicate that transmission of the service data by the service provider identified by the service provider ID in the access request message was refused.

The service provider system includes fourth storage device, issuance device, and fourth transmission device. The fourth storage device stores user attribute information in which item names and item values of attributes of the user for identifying the user, who uses service data, are associated.

The issuance device verifies, upon receiving the transmitted authentication federation request message, validity of the authentication federation request message, based on the user ID in the authentication federation request message, and issues, if a result of the verification indicates the validity, a service provider authentication token including the user ID used in the verification.

The fourth transmission device transmits the service data to the user terminal identified by the user ID in the issued service provider authentication token.

FIG. 1 is a schematic view illustrating a configuration example of a policy management system according to an embodiment. FIG. 2 is a schematic view illustrating an example of an old policy which is stored in a policy storage device according to the embodiment. FIG. 3 is a schematic view illustrating an example of a new policy which is stored in the policy storage device according to the embodiment. FIG. 4 is a schematic view illustrating an example of policy difference-adaptive definition information which is stored in a policy difference-adaptive definition storage device according to the embodiment. FIG. 5 is a schematic view illustrating a configuration example of a policy evaluation device according to the embodiment.

As illustrated in FIG. 1, a policy management system 1 includes a user terminal 100 which is operated by a user, an ID provider system 200, and a plurality of service provider systems 300. Incidentally, although there are a plurality of service provider systems 300 in usual cases, only one service provider system 300 is illustrated here. The detailed functions of the respective apparatuses 100 to 300 will be described below.

The user terminal 100 is an apparatus which includes ordinary computer functions and is communicable with the ID provider system 200 and each service provider system 300. For example, the user terminal 100 includes a function of transmitting, in response to a user operation, an access request message indicating that the user wishes to use services which are provided by the service provider system 300; a function of executing a login process with the ID provider system 200; a function of receiving service data from the service provider system 300; and a function of reproducing the received service data by a CPU executing a service use application which is prestored in a memory. In addition, the user terminal 100 includes a function of redirecting (returning) various messages which are sent from the ID provider system 200 and each service provider system 300.

Here, the ID provider system 200 manages the identity of the user, and includes a user attribute information storage device 201, a policy storage device 202, a policy difference-adaptive definition storage device 203, an authentication federation device 204, a company portal device 205, a policy evaluation device 206, an ID provisioning device 207, and a refusal screen display device 208.

The user attribute information storage device 201 stores user attribute information which is identity information relating to a user of an organization in which the ID provider system 200 is disposed. Specifically, the user attribute information storage device 201 stores a plurality of pieces of user attribute information in which item names and item values of attributes of a user for identifying the user are associated, the user attribute information including, in the item names, a user ID for identifying the user, the name of the user, a department to which the user belongs, an official position of the user, and reference information which is referred to at a time of a login process of the user.

Incidentally, the user attribute information is a set of information characterizing personal information. Examples of the user attribute information include, as described above, the name of the user, a department to which the user belongs, an official position of the user, and reference information which is referred to at a time of a login process of the user. However, the user attribute information is not limited to these, and may include arbitrary item names and item values, such as a telephone number and a working state. In addition, although a password is usually used as the reference information which is referred to at a time of a login process of the user, the reference information is not limited to the password, and, for instance, biometrics authentication information, such as a user's fingerprint, may be used.

As illustrated in FIG. 2 and FIG. 3, the policy storage device 202 stores a pair of an old policy 202a and a new policy 202b, with respect to each service provider ID which identifies the service provider system 300.

Specifically, the policy storage device 202 stores the paired old policy 202a and new policy 202b which include, with respect to each service provider ID, a determination condition for permitting transmission of service data to the user terminal 100 by the service provider system 300 identified by the service provider ID; a term of validity during which a result of determination by the determination condition is set to be valid; and a transition period (also referred to as a transition suspension period) during which a result of determination by the determination condition of the old policy is also referred to when the old policy 202a is transitioned to the new policy 202b. Incidentally, the determination condition includes a plurality of conditions which are identified by a determination ID, and each of these conditions further includes a plurality of detailed conditions and a duty.

In this case, in the policy, in general, it is defined who (subject) can or cannot (i.e. permission or refusal) perform which operation (action) with respect to which system resource (resource). As an option, a duty is also defined.

As illustrated in FIG. 4, the policy difference-adaptive definition storage device 203 stores policy difference-adaptive definition information 203a with respect to each service provider ID which identifies the service provider system 300. Specifically, the policy difference-adaptive definition storage device 203 stores the policy difference-adaptive definition information 203a including a first difference determination condition which is referred to when the date of transmission of an access request message, which was sent from the user terminal 100, is within the transition period, and a second difference determination condition which is referred to when the date of transmission of an access request message, which was sent from the user terminal 100, is out of the transition period. Incidentally, the first difference determination condition includes a plurality of conditions which are identified by a difference-adaptive ID, and each of these conditions further includes a plurality of detailed conditions and a suggestion of a determination ID that is applied. In addition, the second difference-adaptive determination condition includes a condition, which is identified by a difference-adaptive ID, and a duty.

The authentication federation device 204 includes an ID provider function of Single Sign-On. Specifically, the authentication federation device 204 includes the following functions (f204-1) to (f204-4).

(f204-1) A function of executing a login process for authenticating a user ID and user authentication information which were sent from the user terminal 100, based on a user ID and reference information in the user attribute information storage device 201.

(f204-2) A function of issuing, when the login process was successfully executed, an ID provider authentication token, which includes the user ID used in the login process, to the user terminal 100.

(f204-3) A function of creating, upon receiving an authentication federation request from the ID provisioning device 207, an authentication assertion by generating a signature, which is based on a signature generation key (secret key) in a key storage device (not shown), for an assertion body including the user ID in the ID provider authentication token, the authentication assertion including the assertion body, the digital signature, and a signature verification key (public key) corresponding to the signature generation key.

(f204-4) A function of transmitting an authentication federation request message including the created authentication assertion to an authentication federation device 302 in the service provider system 300 via the user terminal 100, that is, a function of transmitting the authentication federation request message to the authentication federation device 302 in the service provider system 300 by using a redirect function of the user terminal 100.

Upon accepting an input of an access request message from the user terminal 100, the company portal device 205 transfers the access request message, the input of which was accepted, to the policy evaluation device 206. Incidentally, the access request message includes an ID provider authentication token which was issued by the authentication federation device 204, and a service provider ID indicative of the service provider system which can provide service data that the user wishes to use.

Upon accepting an input of the access request message from the company portal device 205, the policy evaluation device 206 determines whether or not to permit transmission of service data to the user terminal 100 by the service provider system 300 which is identified by the service provider ID in the access request message the input of which was accepted, based on the old policy 202a and/or new policy 202b stored in the policy storage device 202. Incidentally, the details of the policy evaluation device 206 will be described later.

The ID provisioning device 207 transmits an authentication federation request to the authentication federation device 204, in accordance with an instruction from the policy evaluation device 206. In addition, with respect to user attribute information stored in a user attribute information storage device 301 in the service provider system 300, the ID provisioning device 207 executes a registration request process of the user attribute information, an update request process, a deletion request process, and a search request process.

In accordance with an instruction from the policy evaluation device 206, the refusal screen display device 208 transmits to the user terminal 100 refusal screen information indicating that transmission of service data by the service provider system 300, which is identified by the service provider ID in the access request message, was refused. Specifically, the refusal screen display device 208 causes the user terminal 100 to display a refusal screen.

Referring now to FIG. 5, the policy evaluation device 206 is described in detail. The policy evaluation device 206 includes, as illustrated in FIG. 5, a policy evaluation request unit 211, a new policy acquisition unit 212, an old policy necessity/nonnecessity determination unit 213, an old policy acquisition unit 214, an attribute information collection unit 215, a policy evaluation unit 216, a policy difference-adaptive determination unit 217, a policy difference-adaptive definition acquisition unit 218, and an ID provisioning execution request unit 219.

Upon accepting an input of an access request message from the company portal device 205, the policy evaluation request unit 211 acquires, via the new policy acquisition unit 212, a new policy 202*b* from among policies which define the determination conditions for permitting transmission of service data to the user terminal 100 by the service provider system 300 identified by the service provider ID in the access request message the input of which was accepted.

Using the transition period defined in the new policy acquired by the policy evaluation request unit 211, the old policy necessity/nonnecessity determination unit 213 determines whether the date of transmission of the access request message by the user terminal 100 is included in this transition period or not. If the determination result indicates that the date of transmission is included, the old policy necessity/nonnecessity determination unit 213 acquires, via the old policy acquisition unit 214, the old policy 202*a* corresponding to the new policy 202*b* acquired by the policy evaluation request unit 211. If the determination result indicates that the date of transmission is not included, the old policy necessity/nonnecessity determination unit 213 determines that there is no need to acquire the old policy 202*a* and does not acquire the old policy 202*a*.

The attribute information collection unit 215 acquires user attribute information from the user attribute information storage device 201, by using the user ID included in the ID provider authentication token in the access request message. The attribute information collection unit 215 confirms, via the ID provisioning device 207, whether the acquired user attribute information is stored in the user attribute information storage device 301 in the service provider system 300. Specifically, the attribute information collection unit 215 instructs the ID provisioning device 207 to search the user attribute information storage device 301 in the service provider system 300 by using the acquired user attribute information.

The policy evaluation unit 216 evaluates the acquired policy by using the user attribute information acquired by the attribute information collection unit 215.

Specifically, the policy evaluation unit 216 evaluates both the old policy 202*a* and the new policy 202*b*, or evaluates only the new policy 202*b*.

The policy difference-adaptive determination unit 217 determines whether there is a need to acquire the policy difference-adaptive definition information 203*a* stored in the policy difference-adaptive definition storage device 203, based on the evaluation result by the policy evaluation unit 216 (i.e. establishment of any one of plural conditions defined in the policy). Specifically, the policy difference-adaptive determination unit 217 includes the following functions (f217-1) to (f217-7).

(f217-1) A function of determining whether the policy evaluation unit 216 evaluated both the old policy 202*a* and new policy 202*b*, or evaluated only the new policy 202*b*.

(f217-2) A function of the policy difference-adaptive determination unit 217, which determines, if the result of determination by (f217-1) indicates that both were evaluated, whether the evaluation result of the old poly 202*a* by the policy evaluation unit 216 agrees with the evaluation result of the new policy 202*b*.

(f217-3) A function of determining that there is no need to acquire the policy difference-adaptive definition information 203*a*, if the result of determination by (f217-2) indicates that both determination results agree.

(f217-4) A function of determining that there is a need to acquire the policy difference-adaptive definition information 203*a*, if the result of determination by (f217-2) indicates that both determination results do not agree, and acquiring the policy difference-adaptive definition information 203*a* via the policy difference-adaptive definition acquisition unit 218.

(f217-5) A function of determining, if the result of determination by (f217-1) indicates that only the new policy 202*b* was evaluated, whether the evaluation result of the new policy 202*b* is refusal (i.e. establishment of NEW-DENY-3 in FIG. 3) and it is confirmed that the user attribute information is stored by the attribute information collection unit 215.

(f217-6) A function of determining, if the result of determination by (f217-5) indicates that the evaluation result of the new policy 202*b* is refusal and it is confirmed that the user attribute information is stored, that there is a need to acquire the policy difference-adaptive definition information 203*a*, and acquiring the policy difference-adaptive definition information 203*a* via the policy difference-adaptive definition acquisition unit 218.

(f217-7) A function of determining, if the result of determination by (f217-5) indicates "No", that there is no need to acquire the policy difference-adaptive definition information 203*a*.

The ID provisioning execution request unit 219 executes, when the policy difference-adaptive definition information 203*a* has been acquired by the policy difference-adaptive determination unit 217, a process according to a duty in a condition defined in a policy which has priority according to the definition of the acquired policy difference-adaptive definition information 203*a*. In addition, when the policy difference-adaptive definition information 203*a* has not been acquired by the policy difference-adaptive determination unit 217, the ID provisioning execution request unit 219 executes a process according to a duty in the established condition, based on the evaluation result by the policy evaluation unit 216. In the meantime, examples of the process executed by the ID provisioning execution request unit 219 include a process of transmitting an authentication federation transmission request to the ID provisioning device 207 in order to cause the ID provisioning device 207 to transmit an authentication federation request; a process of transmitting a deletion transmission request to the ID provisioning device 207 in order to cause the ID provisioning device 207 to transmit a deletion request for deleting the user attribute information stored in the user attribute information storage device 301 in the service provider system 300; and a process of transmitting a refusal screen information transmission request to the refusal screen display device 208 in order to cause the refusal screen display device 208 to transmit refusal screen information.

In addition, the service provider system 300 is configured to provide service data to the user terminal 100, and includes, as illustrated in FIG. 1, a user attribute information storage device 301, an authentication federation device 302, a service provision device 303, and an ID provisioning device 304.

The user attribute information storage device 301 stores user attribute information which is identity information of the user who uses service data by the service provider system 300. This user attribute information may be composed of the same item names as the user attribute information stored in the user attribute information storage device 201 in the ID provider system 200, or may be composed of a part of the item names of the user attribute information stored in the user attribute information storage device 201.

The authentication federation device 302 includes a service provider function of Single Sign-On. Specifically, the authentication federation device 302 includes the following functions (f302-1) to (f302-3).

(f302-1) A function of verifying, upon accepting an input of an authentication federation request message from the authentication federation device 204 in the ID provider system 200, the digital signature included in the authentication assertion in the authentication federation request message the input of which was accepted, by using the signature verification key included in the authentication assertion.

Specifically, to begin with, the authentication federation device 302 decrypts the assertion body corresponding to the digital signature by using the signature verification key included in the authentication assertion. Thereafter, the authentication federation device 302 determines whether the user ID included in the decrypted assertion body is stored in the user attribute information storage device 301, thereby verifying the validity of the authentication federation request message.

(f302-2) A function of issuing, if a result of verification by the function of (f302-1) indicates validity, a service provider authentication token which includes the user ID used in the verification.

Incidentally, when an access request message from the user is in the form of an HTTP request, the issued service provider authentication token is stored in a cookie included in the HTTP request.

(f302-3) A function of transmitting to the user terminal 100 a service provision request message including the service provider authentication token issued by the function of (f302-2).

Upon accepting an input of a service provision request message which was returned by the redirect function of the user terminal 100, the service provision device 303 transmits service data, which can be provided by the service provider system 300, to the user terminal 100.

In accordance with a request from the ID provisioning device 207 in the ID provider system 200, the ID provisioning device 304 executes a registration process, an update process, a deletion process and a search process of the user attribute information stored in the user attribute information storage device 301.

Next, an example of the operation of the policy management system with the above-described configuration is described with reference to the schematic views of FIG. 2 to FIG. 4 and sequence charts of FIG. 6 and FIG. 7. In this example of the operation, however, it is assumed that an advance process (login process) using the functions of (f204-1) and (f204-2) of the authentication federation device 204 was executed in advance, and the ID provider authentication token was issued. In addition, in this example of the operation, it is assumed that the department, to which the user who operates the user terminal belongs, is "X department", the official position of the user is "chief", and the date (date of transmission), on which the access request message was transmitted by the user terminal, is "2011/10/10".

To start with, in accordance with an operation by the user, the user terminal 100 transmits to the ID provider system 200 the access request message including the ID provider authentication token, which was issued at the time of the advance process, and the service provider ID indicative of the service provider system 300 which can provide service data that the user wishes to use (step S1).

Subsequently, upon accepting an input of the access request message from the user terminal 100, the company portal device 205 in the ID provider system 200 transfers the access request message, the input of which was accepted, to the policy evaluation device 206 (step S2).

Next, upon accepting an input of the access request message from the company portal device 205, the policy evaluation request unit 211 in the policy evaluation device 206 acquires, via the new policy acquisition unit 212, a new policy 202*b* from among policies which define the determination conditions for permitting transmission of service data to the user terminal 100 by the service provider system 300 identified by the service provider ID in the access request message the input of which was accepted (step S3). Here, it is assumed that the new policy 202*b* shown in FIG. 3 was acquired.

Subsequently, using the transition period defined in the new policy 202*b* acquired in the process of step S3, the old policy necessity/nonnecessity determination unit 213 determines whether the date of transmission of the access request message by the user terminal 100 is included in this transition period or not (step S4). In this case, since the date of transmission of the access request message is "2011/10/10" and the transition period defined in the new policy 202*b* is "2011/10/1~2011/10/30", it is determined that the date of transmission of the access request message is included in this transition period.

Incidentally, if the result of determination in step S4 indicates "No", the process goes to step S6 which is described later.

If the result of determination in step S4 indicates that the date of transmission is included in the transition period, the old policy necessity/nonnecessity determination unit 213 acquires, via the old policy acquisition unit 214, the old policy 202*a* corresponding to the new policy 202*b* acquired in the process of step S3 (step S5). Here, it is assumed that the old policy 202*a* shown in FIG. 2 was acquired.

Next, the attribute information collection unit 215 acquires user attribute information from the user attribute information storage device 201, by using the user ID included in the ID provider authentication token in the access request message. Then, in order to confirm whether the acquired user attribute information is stored in the user attribute information storage device 301 or not, the attribute information collection unit 215 transmits a confirmation request message, which includes the user ID in the acquired user attribute information (which may be, alternatively, the name of the user or the user attribute information itself), to the ID provisioning device 304 via the ID provisioning device 207. Upon accepting an input of the confirmation request message which was transmitted from the attribute information collection unit 215, the ID provisioning device 304 determines ("search") whether the user ID in the confirmation request message, the input of which was accepted, is included in the user attribute information storage device 301, and informs the ID provider system 200 of the result of determination (step S6). Here, it is assumed that the ID provider 200 was notified that the user ID in the user attribute information acquired by the attribute information collection unit 215 is stored in the user attribute information storage device 301.

Subsequently, the policy evaluation unit 216 evaluates the policy acquired up to this process, by using the user attribute information acquired in the process of step S6. Specifically, the policy evaluation unit 216 evaluates both the new policy 202b and the old policy 202a, or evaluates only the new policy 202b (step S7). Here, the policy evaluation unit 216 evaluates both the new policy 202b and the old policy 202a. In the evaluation of the new policy 202b, since the department, to which the user belongs, is "X department", the official position of the user is "chief", and "User ID of service provider system has already been registered", the determination condition of Determination ID "NEW-DENY-3" of the new policy 202b shown in FIG. 3 is satisfied (i.e. Determination ID "NEW-DENY-3" is established). In addition, similarly, in the evaluation of the old policy 202a, since the department, to which the user belongs, is "X department", the official position of the user is "chief", and "User ID of service provider system has already been registered", the determination condition of Determination ID "OLD-PERMIT-2" of the old policy 202a shown in FIG. 2 is satisfied (i.e. Determination ID "OLD-PERMIT-2" is established).

Next, the policy difference-adaptive determination unit 217 determines whether there is a need to acquire the policy difference-adaptive definition information 203a stored in the policy difference-adaptive definition storage device 203, by using the above-described functions (f217-1) to (f217-7) (step S8). Here, in the process of step S7, both the new policy 202b and the old policy 202a are evaluated, and Determination ID "NEW-DENY-3" is established (i.e. refusal) in the new policy 202b, and Determination ID "OLD-PERMIT-2" is established (i.e. permission) in the old policy 202a. Thus, the policy difference-adaptive determination unit 217 determines that there is a need to acquire the policy difference-adaptive definition information 203a, and acquires the policy difference-adaptive definition information 203a shown in FIG. 4 via the policy difference-adaptive definition acquisition unit 218.

Subsequently, the ID provisioning execution request unit 219 executes a process according to a duty in the condition identified by the applied determination ID (step S9). In this case, in the process of step S8, the policy difference-adaptive definition information 203a was acquired. Thus, the ID provisioning execution request unit 219 refers to the policy difference-adaptive definition information 203a, and executes a duty "execution of authentication federation request" in the condition identified by Determination ID "OLD-PERMIT-2", in accordance with the condition identified by difference-adaptive ID "DIFF-2". Specifically, the ID provisioning execution request unit 219 transmits an authentication federation transmission request to the ID provisioning device 207.

Next, upon receiving the authentication federation transmission request from the ID provisioning execution request unit 219, the ID provisioning device 207 transmits an authentication federation request to the authentication federation device 204 (step S10).

Subsequently, upon receiving the authentication federation request from the ID provisioning device 207, the authentication federation device 204 generates a signature which is based on a signature generation key (secret key) in a key storage device (not shown) for an assertion body including the user ID in the ID provider authentication token, and creates an authentication assertion including the assertion body, the digital signature, and a signature verification key (public key) corresponding to the signature generation key (step S11).

Next, the authentication federation device 204 transmits an authentication federation request message, which includes the authentication assertion created in the process of step S11, to the authentication federation device 302 via the user terminal 100 (step S12).

Subsequently, upon accepting an input of the authentication federation request message which was transmitted from the authentication federation device 204, the authentication federation device 302 in the service provider system 300 verifies the digital signature included in the authentication assertion in the authentication federation request message the input of which was accepted, by using the signature verification key included in the authentication assertion. Specifically, the authentication federation device 302 decrypts the assertion body corresponding to the digital signature by using the signature verification key included in the authentication assertion. Thereafter, the authentication federation device 302 determines whether the user ID included in the decrypted assertion body is stored in the user attribute information storage device 301, thereby verifying the validity of the authentication federation request message (step S13). In this case, in the process of step S6, it was confirmed that the user ID is stored in the user attribute information storage device 301. Thus, the authentication federation device 302 determines that the authentication federation request message is valid, and issues a service provider authentication token which includes the user ID.

Next, the authentication federation device 302 transmits to the user terminal 100 a service provision request message including the service provider authentication token issued in the process of step S13 (step S14).

Subsequently, upon accepting an input of the service provision request message which was transmitted from the authentication federation device 302, the user terminal 100 redirects (returns) the service provision request message, the input of which was accepted, to the service provider system 300 (step S15).

Next, upon accepting an input of the service provision request message which was returned from the user terminal 100, the service provision device 303 in the service provider system 300 transmits service data, which can be provided by the service provider system 300, to the user terminal 100 (step S16).

Thereafter, upon accepting an input of the service data which was transmitted from the service provider system 300, the user terminal 100 reproduces the service data the input of which was accepted (step S17).

According to the above-described embodiment, by the configuration including the ID provider system 200 which includes the policy difference-adaptive definition storage device 203 and policy evaluation device 206, a policy update work can be realized in a nonmanual manner.

Next, a modification of the above-described embodiment is described.

[Modification]

A description is given of a modification of the operation of the policy management system with reference to the schematic views of FIG. 2 to FIG. 4 and sequence charts of FIG. 6 and FIG. 8. In this example of the operation, however, it is assumed that an advance process (login process) using the functions of (f204-1) and (f204-2) of the authentication federation device 204 was executed in advance, and the ID provider authentication token was issued. In addition, in this example of the operation, it is assumed that the department, to which the user who operates the user terminal belongs, is "X department", the official position of the user is "chief", and the date (date of transmission), on which the access request message was transmitted by the user terminal, is "2011/11/1".

The process of steps S1 to S3 is executed in the same manner as in the above-described embodiment.

In the process of step S4, since the date of transmission of the access request message is "2011/11/1" and the transition period defined in the new policy 202b is "2011/10/1~2011/10/30", it is determined that the date of transmission of the access request message is not included in this transition period (i.e. it is determined that the date of transmission of the access request message is out of the transition period). Thus, the process of step S5 is skipped, and the process goes to step S6.

In addition, the process of step S6 is executed in the same manner as in the above-described embodiment.

In the process of step S7, the policy evaluation unit 216 evaluates only the new policy 202b. In this case, since the department, to which the user belongs, is "X department", the official position of the user is "chief", and "User ID of service provider system has already been registered", the determination condition of Determination ID "NEW-DENY-3" of the new policy 202b shown in FIG. 3 is satisfied (i.e. Determination ID "NEW-DENY-3" is established).

In the process of step S8, since only the new policy 202b is evaluated in the process of step S7, Determination ID "NEW-DENY-3" is established (i.e. refusal) in the new policy 202b and it is confirmed that the user attribute information is stored by the attribute information collection unit 215 (by the above-described process of step S6), the policy difference-adaptive determination unit 217 determines that there is a need to acquire the policy difference-adaptive definition information 203a, and acquires the policy difference-adaptive definition information 203a shown in FIG. 4 via the policy difference-adaptive definition acquisition unit 218.

In the process of step S9, since the policy difference-adaptive definition information 203a was acquired in the process of step S8, the ID provisioning execution request unit 219 refers to the policy difference-adaptive definition information 203a, and executes a duty "execution of refusal screen display" in the condition identified by Determination ID "NEW-DENY-3" in accordance with the condition identified by difference-adaptive ID "DIFF-5", and executes a duty "execution of deletion of user ID of service provider system". Specifically, the ID provisioning execution request unit 219 transmits a refusal screen information transmission request to the refusal screen display device 208, and transmits a deletion transmission request to the ID provisioning device 207.

Subsequently, upon receiving the deletion transmission request from the ID provisioning execution request unit 219, the ID provisioning device 207 transmits a deletion request message, which includes the user ID in the ID provider authentication token, to the ID provisioning device 304 (step S18).

Next, upon accepting an input of the deletion request message which was transmitted from the ID provisioning device 207, the ID provisioning device 304 in the service provider system 300 deletes, from the user attribute information storage device 301, the user ID (user attribute information) in the deletion request message the input of which was accepted (step S19).

In addition, upon receiving the refusal screen information transmission request which was transmitted in the process of step S10, the refusal screen display device 208 transmits refusal screen information to the user terminal 100 (step S20).

Thereafter, upon accepting an input of the refusal screen information which was transmitted from the refusal screen display device 208, the user terminal 100 displays a refusal screen in accordance with the refusal screen information the input of which was accepted (step S21).

According to the above-described modification, an update work of the system environment due to policy update (i.e. deletion of the user ID (user attribute information) stored in the user attribute information storage device 301) can also be realized in a nonmanual manner.

The method that has been described in connection with each of the above embodiments may be stored as a computer-executable program in a storage medium such as a magnetic disk (e.g. a floppy (trademark) disk, a hard disk), an optical disk (e.g. a CD-ROM, a DVD), a magneto-optic disc (MO), or a semiconductor memory, and may be distributed.

Additionally, the storage form of this storage medium may be any form as long as the storage medium can store programs and is readable by a computer.

Additionally, an OS (operating system) running on a computer based on an instruction of a program installed from the storage medium into the computer, or MW (middleware), such as database management software or network software, may execute a part of each of processes for realizing the above embodiments.

Additionally, the storage medium in each embodiment is not limited to a medium which is independent from the computer, and includes a storage medium which stores or temporarily stores, by download, a program which is transmitted over a LAN or the Internet.

Additionally, the number of storage media is not limited to one. The configuration of the storage media in the invention includes such a case that the process in each of the above-described embodiments is executed from a plurality of media, and the configuration of the media may be any configuration.

Incidentally, the computer in each embodiment is a computer which executes each process in each embodiment, based on a program stored in the storage medium. The computer may have any configuration, for example, a configuration as a single apparatus such as a personal computer, or a configuration as a system in which a plurality of apparatuses are connected over a network.

Additionally, the computer in each embodiment is not limited to a personal computer, and is a general concept of equipment and apparatuses including an arithmetic processing apparatus included in information processing equipment, a microcomputer, etc., which can realize the functions of the invention by programs.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A policy management system comprising:
a user terminal, an ID provider system configured to manage an identity of a user who operates the user terminal, and a service provider system configured to provide service data to the user terminal,
the user terminal having first processing circuitry
configured to execute a login process with the ID provider system in accordance with an operation of the user,
configured to transmit to the ID provider system an access request message including an ID provider authentication token, which is issued at a time of the login process and includes a user ID which identifies the user, and a service provider ID which identifies the service provider system, and
configured to receive the service data which is transmitted from the service provider system, and reproducing the received service data,
the ID provider system having
first memory configured to store user attribute information which includes at least the user ID and a department to which the user belongs, and in which item names and item values of attributes of the user for identifying the user are associated,
second memory configured to store a pair of an old policy and a new policy, with respect to each said service provider ID, the old policy and the new policy defining at least a determination condition for permitting transmission of the service data by the service provider system identified by the service provider ID, and a transition period indicative of a period during which a determination result by the determination condition of not only the new policy but also the old policy is referred to when the old policy is transitioned to the new policy, the determination condition including a plurality of conditions which are identified by a determination ID, and each of the plurality of conditions including a condition indicating the department to which the user belongs, and further including a plurality of detailed conditions and a duty of registration of the user ID, a duty of transmission of an authentication federation request message, and a duty of transmission of a refusal screen information,
third memory configured to store difference-adaptive definition information with respect to each said service provider ID, the difference-adaptive definition information including a first difference determination condition which is referred to when a date of transmission of the transmitted access request message is within the transition period, the first different determination condition indicating the determination ID of a policy having priority according to an evaluation result of the old policy and an evaluation result of the new policy, and a second difference determination condition which is referred to when the date of transmission of the transmitted access request message is out of the transition period, the second difference determination condition including a condition, which is identified by a difference-adaptive ID, and a duty of deletion of the user ID, and
second processing circuitry
configured to acquire, upon receiving the transmitted access request message, the new policy corresponding to the service provider ID in the access request message,
configured to determine whether the date of transmission of the access request message is included in the transition period defined in the acquired new policy,
configured to acquire the old policy corresponding to the acquired new policy, if a result of the determination indicates that the date of transmission is include,
configured to acquire the user attribute information stored in the first memory, based on the user ID included in the ID provider authentication token in the access request message, and confirming whether the user ID is stored in the service provider system identified by the service provider ID in the access request message,
configured to receive a notification which is transmitted from the service provider system and corresponds to the second processing circuitry, the notification indicating that the user ID is stored or that the user ID is not store,
configured to evaluate the acquired new policy, or the acquired new policy and old policy, based on the acquired user attribute information;
configured to determine whether there is a need to acquire the difference-adaptive definition information, based on a result of the evaluation and the received notification,
configured to acquire the difference-adaptive definition information, if a determination result by the second processing circuitry indicates that there is the need to acquire the difference-adaptive definition information,
configured to decide on the determination ID that is applied, based on at least the evaluation result,
configured to request execution of the duty in the condition identified by the determination ID that was decided on,
configured to transmit, in accordance with a request, an authentication federation message including at least the user ID, which is included in the ID provider authentication token in the access request message, to the service provider system identified by the service provider ID in the access request message, and
configured to transmit to the user terminal, in accordance with a request, refusal screen information which effects display to indicate that transmission of the service data by the service provider identified by the service provider ID in the access request message was refused, and
the service provider system having
fourth memory configured to store user attribute information in which item names and item values of attributes of the user for identifying the user, who uses service data, are associated,
third processing circuitry
configured to verify, upon receiving the transmitted authentication federation request message, validity of the authentication federation request message, based on the user ID in the authentication federation request message, and issue, if a result of the verification indicates the validity, a service provider authentication token including the user ID used in the verification, and configured to transmit the service data to the user terminal identified by the user ID in the issued service provider authentication token, wherein the second processing circuitry decides on the determination ID that is applied also by referring to the difference-adaptive definition information when the difference-adaptive definition information was acquired by the second processing circuitry, and wherein the second processing circuitry requests execution of the duty in the second difference determination condition when the second difference determination condition defined in the difference-adaptive definition information was referred to by the second processing circuitry.

2. An ID provider system which is communicable with a user terminal configured to transmit an access request message which includes an ID provider authentication token including a user ID that identifies a user, and includes a service provider ID which identifies a service provider system, and is communicable with a service provider system configured to provide service data to the user terminal and to include storage device for storing user attribute information in which item names and item values of attributes of the user for identifying the user, who uses service data, are associated, the ID provider system comprising:

first memory configured to store user attribute information which includes at least the user ID and a department to which the user belongs, and in which item names and item values of attributes of the user for identifying the user are associated;

second memory configured to store a pair of an old policy and a new policy, with respect to each said service provider ID, the old policy and the new policy defining at least a determination condition for permitting transmission of the service data by the service provider system identified by the service provider ID, and a transition period indicative of a period during which a determination result by the determination condition of not only the new policy but also the old policy is referred to when the old policy is transitioned to the new policy, the determination condition including a plurality of conditions which are identified by a determination ID, and each of the plurality of conditions including a condition indicating the department to which the user belongs, and further including a plurality of detailed conditions and a duty of registration of the user ID, a duty of transmission of an authentication federation request message, and a duty of transmission of a refusal screen information;

third memory configured to store difference-adaptive definition information with respect to each said service provider ID, the difference-adaptive definition information including a first difference determination condition which is referred to when a date of transmission of the transmitted access request message is within the transition period, the first difference determination condition indicating the determination ID of a policy having priority according to an evaluation result of the old policy and an evaluation result of the new policy, and a second difference determination condition which is referred to when the date of transmission of the transmitted access request message is out of the transition period, the second difference determination condition including a condition, which is identified by a difference-adaptive ID, and a duty of deletion of the user ID; and processing circuitry configured to acquire, upon receiving the transmitted access request message, the new policy corresponding to the service provider ID in the access request message, configured to determine whether the date of transmission of the access request message is included in the transition period defined in the acquired new policy, configured to acquire the old policy corresponding to the acquired new policy, if a determination result by the processing circuitry indicates that the date of transmission is included, configured to acquire the user attribute information stored in the first memory, based on the user ID included in the ID provider authentication token in the access request message, and confirming whether the user ID is stored in the service provider system identified by the service provider ID in the access request message, configured to receive a notification which is transmitted from the service provider system and corresponds to the processing circuitry, the notification indicating that the user ID is stored or that the user ID is not stored, configured to evaluate the acquired new policy, or the acquired new policy and old policy, based on the acquired user attribute information, configured to determine whether there is a need to acquire the difference-adaptive definition information, based on the evaluation result and the received notification, configured to acquire the difference-adaptive definition information, if a determination result by the processing circuitry indicates that there is the need to acquire the difference-adaptive definition information, configured to decide on the determination ID that is applied, based on at least the evaluation result, configured to request execution of the duty in the condition identified by the determination ID that was decided on, configured to transmit, in accordance with a request, an authentication federation message including at least the user ID, which is included in the ID provider authentication token in the access request message, to the service provider system identified by the service provider ID in the access request message, and configured to transmit to the user terminal, in accordance with a request, refusal screen information which effects display to indicate that transmission of the service data by the service provider identified by the service provider ID in the access request message was refused, wherein the processing circuitry decides on the determination ID that is applied also by referring to the difference-adaptive definition information when the difference-adaptive definition information was acquired by the processing circuitry, and wherein the processing circuitry requests execution of the duty in the second difference determination condition when the second difference determination condition defined in the difference-adaptive definition information was referred to by the processing circuitry.

3. A policy evaluation device for use in an ID provider system which is communicable with a user terminal configured to transmit an access request message which includes an ID provider authentication token including a user ID that identifies a user, and includes a service provider ID which identifies a service provider system, and is communicable with a service provider system configured to provide service data to the user terminal and to include storage device for storing user attribute information in which item names and item values of attributes of the user for identifying the user, who uses service data, are associated, the ID provider system including first memory configured to store user attribute information which includes at least the user ID and a department to which the user belongs, and in which item names and item values of attributes of the user for identifying the user are associated, second memory configured to store a pair of an old policy and a new policy, with respect to each said service provider ID, the old policy and the new policy defining at least a determination condition for permitting transmission of the service data by the service provider system identified by the service provider ID, and a transition period indicative of a period during which a determination result by the determination condition of not only the new policy but also the old policy is referred to when the old policy is transitioned to the new policy, the determination condition including a plurality of conditions which are identified by a determination ID, and each of the plurality of conditions including a condition indicating the department to which the user belongs, and further including a plurality of detailed conditions and a duty of registration of the user ID, a duty of transmission of an authentication federation request message, and a duty of transmission of a refusal screen information, and third memory configured to store difference-adaptive definition information with respect to each said service provider ID, the difference-adaptive definition information including a first difference determination condition which is referred to when a date of transmission of the transmitted access request message is within the transition period, the first difference determination condition indicating the determination ID of a policy having priority according to an evaluation result of the old policy and an evaluation result of the new policy, and a second difference determination condition which is referred to when the date of transmission of the transmitted access request message is out of the transition period, the second difference determination condition including a condition, which is identified by a difference-adaptive ID, and a duty of deletion of the user ID, the policy evaluation device comprising:
processing circuitry configured to acquire, upon receiving the transmitted access request message, the new policy corresponding to the service provider ID in the access request message, configured to determine whether the date of transmission of the access request message is included in the transition period defined in the acquired new policy, configured to acquire the old policy corresponding to the acquired new policy, if a determination result by the processing circuitry indicates that the date of transmission is included, configured to acquire the user attribute information stored in the first memory, based on the user ID included in the ID provider authentication token in the access request message, and confirming whether the user ID is stored in the service provider system identified by the service provider ID in the access request message, configured to receive a notification which is transmitted from the service provider system and corresponds to the processing circuitry, the notification indicating that the user ID is stored or that the user ID is not stored, configured to evaluate the acquired new policy, or the acquired new policy and old policy, based on the acquired user attribute information, configured to determine whether there is a need to acquire the difference-adaptive definition information, based on the evaluation result and the received notification, configured to acquire the difference-adaptive definition information, if a determination result by the processing circuitry indicates that there is the need to acquire the difference-adaptive definition information, configured to decide on the determination ID that is applied, based on at least the evaluation result, and configured to request execution of the duty in the condition identified by the determination ID that was decided on, wherein the processing circuitry decides on the determination ID that is applied also by referring to the difference-adaptive definition information when the difference-adaptive definition information was acquired by the processing circuitry, and wherein the processing circuitry requests execution of the duty in the second difference determination condition when the second difference determination condition defined in the difference-adaptive definition information was referred to by the processing circuitry.

* * * * *